United States Patent
Barnes, Jr.

(10) Patent No.: US 8,447,643 B2
(45) Date of Patent: May 21, 2013

(54) SYSTEM AND METHOD FOR COLLECTING AND DISTRIBUTING REVIEWS AND RATINGS

(76) Inventor: Melvin L. Barnes, Jr., Annapolis, MD (US)

( * ) Notice: Subject to any disclaimer, the term of this patent is extended or adjusted under 35 U.S.C. 154(b) by 528 days.

(21) Appl. No.: 12/476,910

(22) Filed: Jun. 2, 2009

(65) Prior Publication Data
US 2009/0299824 A1 Dec. 3, 2009

Related U.S. Application Data

(60) Provisional application No. 61/058,116, filed on Jun. 2, 2008.

(51) Int. Cl.
*G06Q 30/00* (2012.01)
*G06Q 30/02* (2006.01)
*G06F 17/30* (2006.01)

(52) U.S. Cl.
CPC ............ *G06Q 30/00* (2013.01); *G06Q 30/0201* (2013.01); *G06Q 30/0263* (2013.01); *G06Q 30/02* (2013.01); *G06Q 30/0255* (2013.01); *G06F 17/30864* (2013.01)
USPC ..... 705/7.29; 705/14.19; 705/14.6; 705/7.37; 707/E17.116

(58) Field of Classification Search
CPC . G06Q 30/0201; G06Q 30/0263; G06Q 30/02; G06Q 30/0255; G06F 17/30864
USPC .................. 705/10, 14.6, 7.37, 14.19, 7.29; 707/E17.116
See application file for complete search history.

(56) References Cited

U.S. PATENT DOCUMENTS

| | | | |
|---|---|---|---|
| 7,958,010 B2 * | 6/2011 | Huang | 705/26.7 |
| 2002/0046203 A1 * | 4/2002 | Siegel et al. | 707/1 |
| 2004/0019688 A1 * | 1/2004 | Nickerson et al. | 709/229 |
| 2007/0271246 A1 * | 11/2007 | Repasi et al. | 707/3 |
| 2008/0147659 A1 * | 6/2008 | Chen et al. | 707/7 |
| 2008/0313144 A1 * | 12/2008 | Huston | 707/3 |

OTHER PUBLICATIONS

Define "toolbar", Microsoft Computer Dictionary, Microsoft Corporation, copyright 2002.*

* cited by examiner

*Primary Examiner* — Ryan Zeender
*Assistant Examiner* — Milena Racic

(57) ABSTRACT

A system and method for providing ratings related to a plurality of websites is provided. One embodiment of the system may include program code adapted to execute as a browser toolbar to implement a method comprising retrieving an identifier from the end user computing device, transmitting a request to a remote computer system for a rating value in response to a web page being loaded into the browser, receiving a rating value from the remote computer system, displaying the rating value in the toolbar, receiving a first user rating of the user from the remote computer system, displaying the first user rating in the toolbar, receiving a user input comprising a second user rating from the end user, transmitting the second user rating to the remote computer system, and displaying the second user rating in the toolbar. The remote computer system may store user ratings and reviews and transmit user ratings, an average rating, and a review count. The remote computer system may also parse URLs to determine whether the domain of the URL comprises a domain for which content may be rated. By parsing out an identifier of the URL for such domains, the system can be used to rate profiles of people on social networks and dating websites.

15 Claims, 9 Drawing Sheets

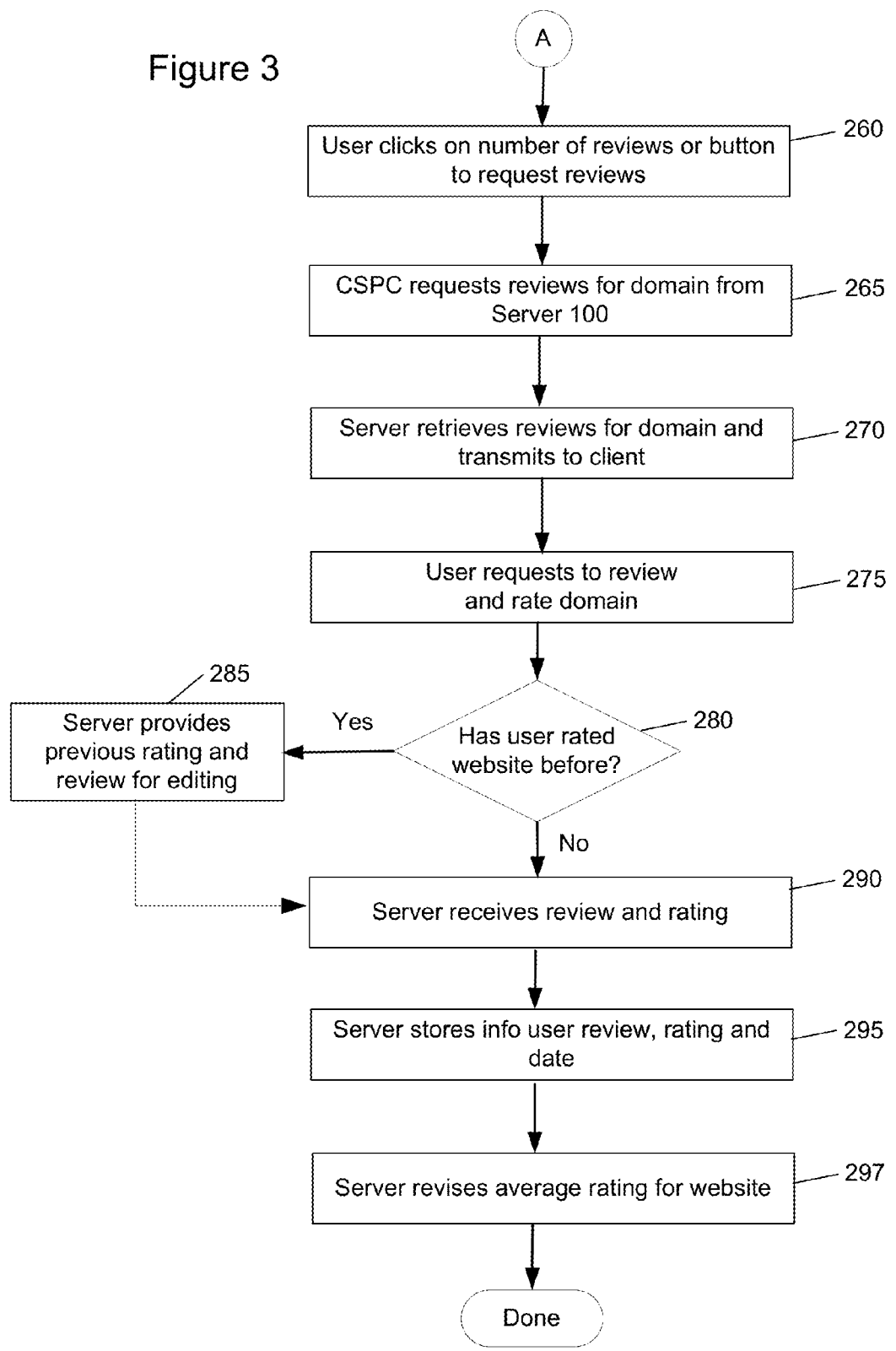

Edit Your Review

Please edit your review of the content below,

Click on a star to provide your rating.

Title of your Review: | evite.com

Your Review
(1500 Char Max): | Good site for inviting people to a party.

Tags | invite, party, gathering

Submit

Mel's Profile

Personal Information
- Name: Mel
- Birthday: Feb. 16, 1963 (46 years old)
- Gender: Male

Recently Review Sites vitaminshoppe.com
★★★ | vitaminshoppe.com   U D B

By: Mel
All Mel's Reviews 0 people found this review helpful
0 give it the ole thumbs down
0 people reported this as a bogus review Pretty good retailer of supplements and vitamins.

★★★★ | evite.com    U D B    131  132  133

By: Mel
All Mel's Reviews 0 people found this review helpful
0 give it the ole thumbs down
0 people reported this as a bogus review Good site for inviting people to a party.

floridacasinoreport.com
★ | floridacasinoreport.com   U D B

By: Mel
All Mel's Reviews 0 people found this review helpful
0 give it the ole thumbs down
0 people reported this as a bogus review technorati.com
★★ | technorati.com   U D B By: Mel
All Mel's Reviews 0 people found this review helpful
0 give it the ole thumbs down
0 people reported this as a bogus review live365.com
★★★★ | live365.com   U D B By: Mel
All Mel's Reviews 0 people found this review helpful
0 give it the ole thumbs down
0 people reported this as a bogus review Pretty good internet radio site.

Figure 7

Post a Review

Please cut and paste the entire URL of the content
that you want to review in the text box below.

`http://`

Is this a person or a website?
○ Person
○ Website

Search Reviews

Enter a search term to see what other ZizBang
members have said about a website or person.

[          ]

[ Search By Keyword ]

Or

Enter a URL into the text box to search for reviews
for that website or person.

[ http://                                        ]

[ Search By Specific URL ]

Or

Enter an email to view all of the reviews of another member.

[          ]

[ Search By Specific URL ]

Figure 9

SYSTEM AND METHOD FOR COLLECTING AND DISTRIBUTING REVIEWS AND RATINGS

CROSS REFERENCE TO RELATED APPLICATIONS

This application claims priority to U.S. Provisional Application No. 61/058,116 filed Jun. 2, 2008, which is hereby incorporated herein by reference in its entirety for all purposes.

FIELD OF THE INVENTION

The present invention generally relates to providing dynamic communications and more particularly, to a system and method for collecting and distributing and presented dynamic real-time metadata such as reviews and ratings.

BACKGROUND OF THE INVENTION

Various websites allow consumers to provide ratings and reviews of products. In addition, various websites and technology allow users (consumers) to communicate with each other on the website. However, there is a need to permit users connect across the Internet (or other network), to receive ratings and reviews of various media content (e.g., websites, videos, audio, images, web pages, products, services, persons (such as users of dating sites, users of social networks, persons in the news, celebrities, politicians, etc.), to receive the ratings and reviews in real time when viewing internet content that contains the rated content, and to easily and quickly provide ratings and reviews of a multitude of types of media content.

In addition, there is a need to allow consumers the read reviews and provide reviews of locations (e.g., a business, park, etc.) wherein the location data is collected by a mobile telephone. Furthermore, there is a need to allow consumers to find other consumers who visit the same locations and the same websites and facilitate communications between such consumers.

These and other advantages may be provided by various embodiments of the present invention.

SUMMARY OF THE INVENTION

The present invention provides a system and method for providing ratings related to a plurality of websites, content and/or locations. One embodiment of the system may include program code adapted to execute as a browser toolbar to implement a method comprising retrieving an identifier from the end user computing device, transmitting a request to a remote computer system for a rating value in response to a web page being loaded into the browser, receiving a rating value from the remote computer system, displaying the rating value in the toolbar, receiving a first user rating of the user from the remote computer system, displaying the first user rating in the toolbar, receiving a user input comprising a second user rating from the end user, transmitting the second user rating to the remote computer system, and displaying the second user rating in the toolbar. The remote computer system may store user ratings and reviews and transmit user ratings, an average rating, and a review count. The remote computer system may also parse URLs to determine whether the domain of the URL comprises a domain for which content may be rated. By parsing out an identifier of the URL for such domains, the system can be used to rate profiles of people on social networks and dating websites.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown.

FIG. 3 is a flow chart of a process for implementing an example embodiment of the present invention;

FIG. 7 depicts an example of a portion of user profile of a host website wherein a plurality of ratings and reviews are displayed according to an example embodiment of the present invention;

FIG. 8 depicts an example interface for providing initiating a review according to an example embodiment of the present invention; and FIG. 9 depicts an example interface for implementing a search according to an example embodiment of the present invention.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

Figure 1:
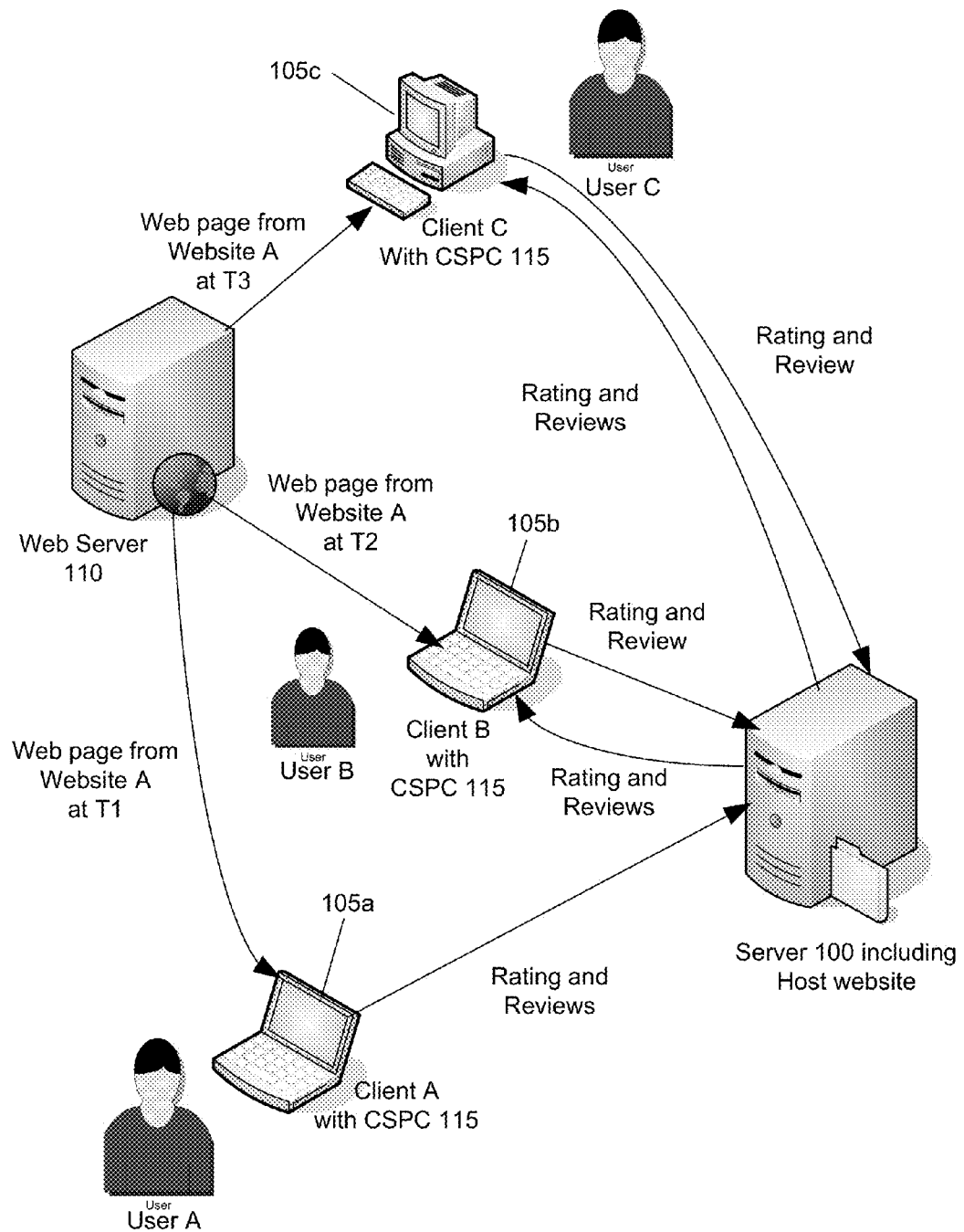
FIG. 1 is a diagram of a plurality of users interacting with an example embodiment of the present invention.

The present invention comprises a system and method for providing dynamic supplemental content such as reviews and ratings for third party websites and other media content. Referring to FIG. 1, in one embodiment the system includes a server 100 that stores supplemental content such as ratings and reviews of the media content (e.g., website). The server 100 may also store and server a website for members to read, edit, and comments on reviews. In addition, the system may include a client side program code (CSPC) 115 that executes, for example, as a browser plug-in (e.g., a toolbar plug-in) in a plurality of clients on end user computing devices 105. In addition, the CSPC 115 may be implemented in a frame or as code, embedded into a web page by a website operator. However, due to security issues, many browsers may preclude some operations of some embodiments of the CSPC 115 when operating as a frame. Consequently, in the description below the CSPC 115 is described as a browser (toolbar) plug-in.

Different embodiments of the present invention may be used to rate and review different content items. For example, a first embodiment may be used to rate or rate and review any website. A second embodiment may additionally facilitate rating and reviewing of images, videos, and profiles of members of a plurality of social networks and dating sites. A third embodiment may further facilitate ratings and reviews of locations. By communicating with the server 100, the CSPC 115 allows users to rate content items, see ratings of the content items (e.g., an average of the ratings supplied by other members of the service), see a count of the number of reviews for content items, and view and provide various other data.

In the following embodiment, users register with a website that manages the review and rating data (hereinafter the "host website"). The host website may be stored and served by the server 100 and comprise a social network including the ability to invite friends, communicate with friends, search for friends, create/join groups, etc. However, the host website may also store (and display) the ratings and reviews of each user, the comments on each review, By interacting with the server 100 via the host website, users may search reviews based on keywords (e.g., search for highest ratings and/or reviews for a product), search for domains or URLs (e.g., find all the reviews associated with a website or page), search by location (e.g., see all reviews for a specific location), and/or perform various other searching. In one embodiment, the toolbar CSPC 115 includes a text box for searching the database of the server 110 based on keywords. Upon registration, in this embodiment a cookie is stored on the user's computer that include a user identifier and used by the CSPC 115 in communications with the server 100 to identify the user.

For each website visited by a user, the CSPC 115 executing in the client (e.g., browser) of that user's computing device 105 may send a request for, receive information of, and display a rating (the average rating and the user's previous rating) and the number of reviews posted for that website (if any). The number of reviews (hereinafter "review count") and rating may be displayed as part of the browser such as under the address bar or in a side bar. See FIGS. 4*a-b*. Alternately, the CSPC 115 may display the information in the task bar or in separate frame. In one embodiment, the CSPC 115 may be "separate from" (not a plug-in) and communicate with multiple types of browsers (e.g., Internet Explorer®, Firefox®, Chrome®, Opera®, etc.).

In one embodiment, the CSPC 115 executes on the end user's computing device and transmits a notification to the server 100 each time a web page of a new domain (or, alternately, anytime a new web page) is loaded into the client browser to thereby inform the server 100 that the user is now viewing content of a new (different) website (or new webpage). The notification may include the new domain (e.g., RealEstateProLocator.com) or the URL of the new webpage (e.g., realestaterpolocator.com/FAQs.html) and the identifier (ID) of the user.

Upon receiving the notification, the server 100 determines the average user rating for the domain, which may be, for example, on a zero to five star rating system. The server 100 may also determine the number of reviews (posted by all users who have visited the website) of the new domain or webpage (i.e., determine the review count). The server 100 then transmits the rating (e.g., a number between zero and five such as 4.2) and a number representing the review count. In addition, if that user has previously rated the website (or webpage) the server 100 retrieves and transmits the user's previous rating as well. The information of the average rating, the review count, and the user's previous review are referred to herein collectively as "rating/review data". In this embodiment, the average is computed. In other embodiments, a mean or other statistic of significance may be computed and provided.

The CSPC 115 receives the rating data and displays the average rating, the review count for the website, and the user's previous rating as discussed above. In one example, the display may include five stars and where a rating of four is received, four stars may be demarcated in some fashion such as by highlighting them via a first color and the other remaining star not demarcated or highlighted (i.e., displayed as a second color) to thereby indicate the website received an average four start rating as shown in FIG. 4.

The user may also elect to rate the website and/or to provide a review of the website (or other content). In one embodiment, the user simply clicks on one of the same five stars (in the frame, or in the browser) to rate the website. In this embodiment, a separate set of stars are used to display the user's previous rating (if any) as shown in FIG. 4*b*. To rate the website or webpage, the user simply clicks on one of the stars. The star clicked on corresponds to a rating (1, 2, 3, 4, or 5 from left to right) that is transmitted to the server 100 by the CSPC 115 (along with the identity of the domain or webpage being rated and the user). The server 100 then stores the rating (e.g., as a first or updated rating for that user) and alters the average rating for that domain (or webpage) accordingly for when users visit the website or webpage subsequently.

If the CSPC 115 is embedded in the web page, the rating data may be displayed on the web page in which case the user simply clicks on the desired star displayed on the web page.

The server 100 stores the rating data (e.g., a number from 1-5) in association with that user and the domain (or other content item). Users also may click on the review count to read reviews of that content item, and to provide reviews about the website or other content.

Referring to FIG. 1, a first user (User A) provides a rating and a review of website A to the server 100 (e.g., via an HTML form). Subsequently, when User B visits website A, the average user rating for website A and the total review count are transmitted to client B for display to User B (and include User A's rating and review as part of the review count).

Figure 4A:
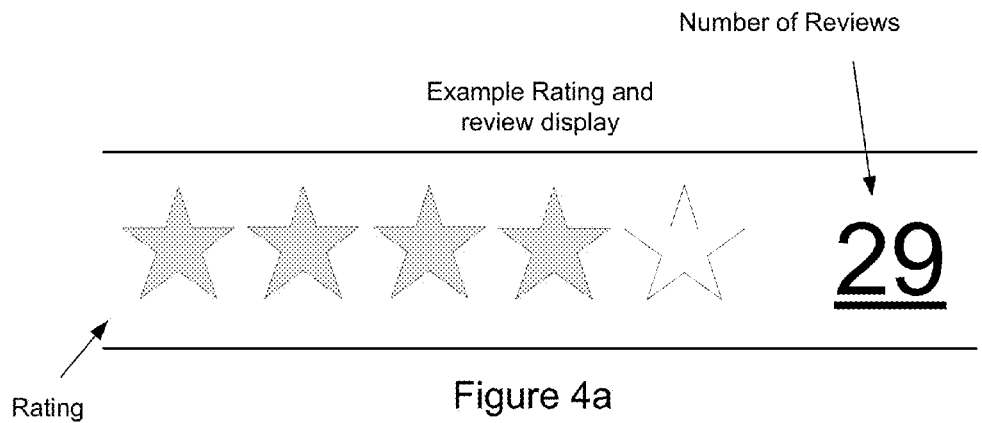
FIG. 4a is depicts an example representation of an average rating and review count according to an example embodiment of the present invention.
Figure 4B:
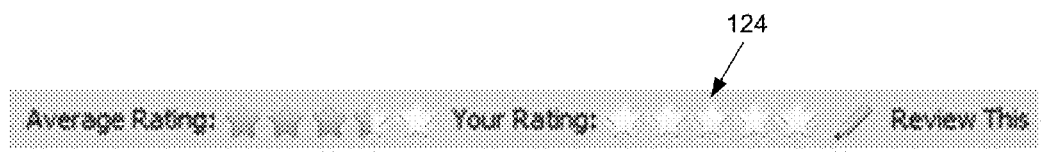
FIGS. 4b-c depict an example toolbar for implementing an example embodiment of the present invention.
Figure 4C:
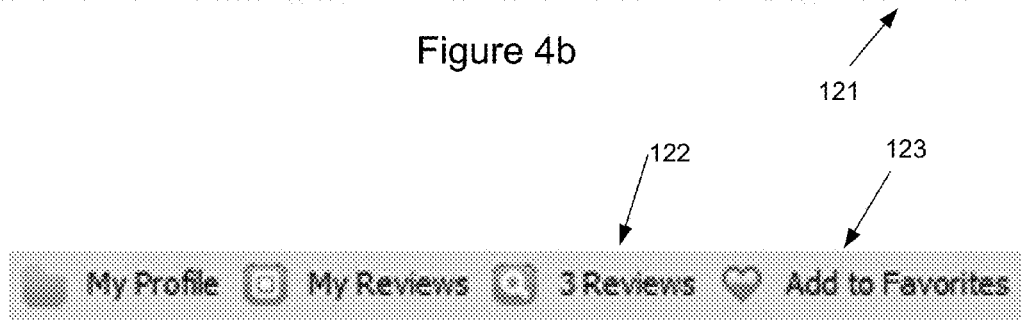

Any user may also elect to read the reviews by clicking on the review count 122 of FIG. 4*c* (the number representing the number of reviews for the website), which causes a request for the reviews for that domain to be sent to the server 100, which in response, retrieves and transmits the most recent thirty reviews, which may be displayed in a cascaded layer above the existing web page or in a new browser or in a new tab.

Figure 6:
FIG. 6 depicts an example interface for providing a rating and review according to an example embodiment of the present invention.

The user may read the reviews and request additional reviews (e.g., the next thirty). The user may also elect to post a review by clicking on a "Review This" button 121 of the CPPC toolbar 115 which may request the user log in with (r provide) a user name and password prior to providing the HTML form as illustrated in FIG. 6. In this embodiment, the same HTML form may be used to first supply and to edit reviews. As discussed, in this embodiment, a cookie stored on the end user's computer automatically logs the user in by storing a user ID. The user's review (and rating) are stored in a database in communication with the server 100. The user also may provide a rating of the domain when posting the review. As shown in FIG. 6 and discussed below, the user may also supply one or more tags (e.g., descriptive words) to be stored along with the domain (e.g., to facilitate searches by user).

Referring to FIG. 1, User B in this example clicks on the review count (e.g., 29) in the browser tool bar (as illustrated in FIG. 4a). In response, client B, due to operation of CSPC, transmits a request for the reviews and ratings of the domain presently loaded in the client, which in this example comprises an HTML page that is displayed in a new tab of the existing browser (or could be in a new layer floating over the web page). Examples of reviews and ratings are depicted in FIG. 7 (although these reviews and ratings are of different websites and provided by the same user).

The received web page may display the most recently received 30 reviews (along with their associated ratings), including the review provided by User A. User B may then click on a link in the page to request a form to supply a review and rating. The server 100 receives the request and transmits the requested form to Client B such as the form depicted in FIG. 8. In the embodiment depicted in FIG. 8, the user may rate/review websites and persons on a plurality of social networks and a plurality of dating sites. Thus, the user may need to supply information for determining whether they are rating a person or website. In other embodiments, the server 100 may include program code for determining whether the URL corresponds a that of person and, if not, the server 100 knows the user is rating a website. Thus, the server 100 may parse out the domain and query a database (a person table in the database) for the domain (where the database lists domains for which person's may be rated). For example, the person table of the database may list all the domains for which person's may be rated (e.g., and include Facebook®, MySpace®, Match®, Digg®, Twitter®, etc.). If the domain is found, the server 100 supplies a form for reviewing a person and if the domain is not found the server 100 transmits a form for reviewing a website (see FIG. 6). When the user completes and submits the form, the server stores the received information in the database in association with that domain and the submitting user. Similarly, when a URL is supplied by the toolbar to the server the server 100 may receive the URL parse the domain from the URL, determine whether the domain comprises a domain on which content may be rated (by searching a first table in the database). If the domain comprises a domain on which content may be rated, the server may parse a content identifier from the URL (by retrieving pre-text and/or post-text information (used for parsing) associated with the domain from the first table), search the database for a content rating value associated with the domain and the content identifier, and transmit the content rating value as the rating value to the browser executing the CSPC that transmitted the request.

The reviews and ratings are stored by the server 100 in a database for retrieval in the future when other users request to read reviews of that domain. The server 100 also allows users to search reviews of a particular domain name. For example, a particular domain may have 1000 reviews, but a user may only be interested in reviews for the domain that relate to the website's customer service, return policy, or a specific product offered for sale by the website. Thus, the server 100 may serve an HMTL form that allows the user to input data for searching the reviews of a particular domain for particular search terms. An example of such a form is illustrated in Figure In addition, the search form may be used to search all the domains for reviews related to a particular product or service as well as to search for all the reviews of a particular domain.

Websites may be categorized into a directory-like fashion according to the subject matter, such as the type of product(s) sold, service offered, information offered, etc. More specifically, the database may store information (e.g., tag words) associated with each content item (e.g., domain) that corresponds to the category of the content item. Users may request and receive the directory and click on any subject matter to see the websites rated in that category such as, for example, in a descending order of their associated rating (e.g., with the higher rated websites displayed above lower rated websites). The server also may allow advertisers (only rated or both rated and non-rated advertisers) to bid for advertisements (e.g., cost per click) based on search keywords, category, and/or subcategory. Thus, when a user searches for a product or clicks on a category in the directory, appropriate advertising may be presented in the margins of the web page displaying the search results and wherein the ads displayed are selected based on a bid price associated with the search terms and score assessed to the ad (e.g., which score may be based on a click through rate of the ad).

Figure 2:
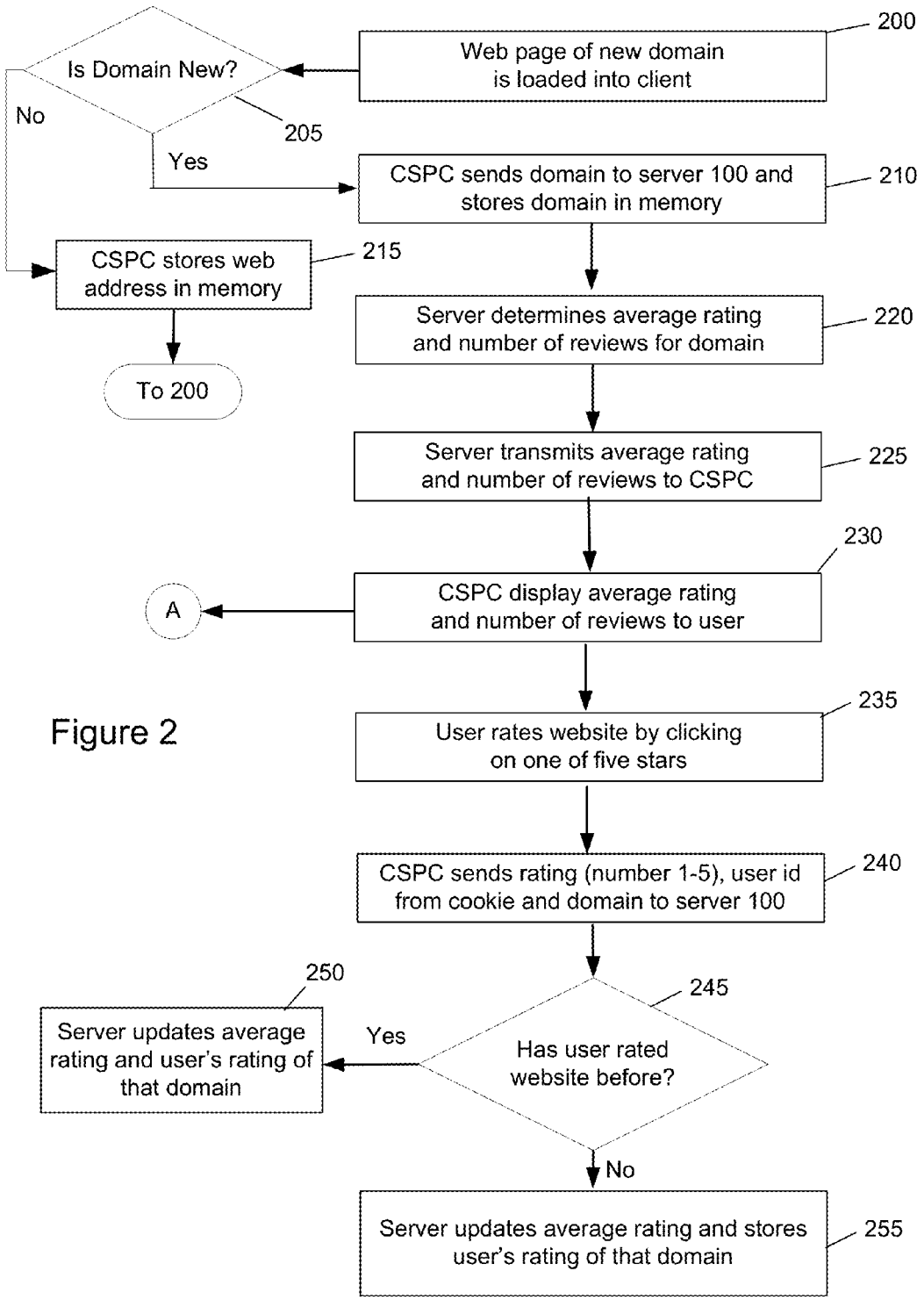
FIG. 2 is a flow chart of a process for implementing an example embodiment of the present invention.

FIGS. 2 and 3 illustrate an example process for performing an example embodiment of the present invention. At process 200, the user is operating a client browser and the web page of a new domain is loaded into the client.

At 205, the program code 115 executing on the user's computer (e.g., the CSPC such as a browser toolbar plug-in), determines if the domain of the webpage loaded is a new domain (or it is the same domain as the previously loaded webpage). In some embodiments, the URL of each web page is transmitted even if it is the same domain as the previous web page.

In this example, each time a web page is loaded (e.g., the web address changes), the CSPC 115 may compare the domain of the web address with the domain of a previously stored web address (or domain). If the domain is the same, the CSPC 115 does not transmit anything to the server 100 in this embodiment, but at 215 stores the new web page address in memory (although this may not be necessary in many embodiments). However, if the domain is different (not the same as the domain of previously stored web address or domain), process 210 transmits a notification that includes information of the new domain to the server 100 (which may comprise transmitting the new web page address (URL)) and the identifier (ID). The CSPC 115 also stores the new domain (which may be stored as part of the new web page address stored) in memory.

In other embodiments, each time a web page is loaded, the web page address and user ID are transmitted to the server 100 and the server 100 determines if the new web page is a web page of a new domain or other content that is rate-able (and sends the average rating and the review count) by comparing the domain (or address) of the new webpage with the domain of the previous web page (stored in memory in association with the transmitting client or user ID). Alternately, the server simply determines the domain upon receiving each such transmission, retrieves the rating and number of reviews, and transmits them to the client to be received by the CSPC 115.

At 220, the server 100 receives the domain (which may be part of a web address transmitted) and user ID (and if necessary parses the web address to obtain the domain) and then determines the average rating (e.g., by retrieving it from memory or computing the average) and the number of reviews for that domain. The server 100 may then store the domain in memory in association with the user ID. Note other embodiments also (or alternately) may use a client ID when performing many of these processes, which may be stored in memory with (or instead of) a user ID. In addition, the server 100 may also retrieve the previously stored rating of that user for that domain.

At 225, the server 100 then transmits the average rating and the review count (and previous rating of that user) to the client transmitting the notification.

At 230, the CSPC 115 receives and displays the average rating, previous rating, and review count to the user in the browser (e.g., in a toolbar under the address text box, on a side bar, in a frame) or in a task bar, frame, the web page, or other suitable location. An example toolbar is illustrated in FIGS. 4b and 4c.

While viewing the website, the user may elect to rate the website. At process 235, the user rates the website by clicking on one of the five stars 124, which may be in the browser (e.g., in a toolbar under the address text box, on a side bar, in a frame), in a task bar, frame, the web page, or other suitable location. In one example illustrated in FIG. 4, the website has received an average rating of 4 stars and has 29 previously stored reviews. Thus, the user may click any of the five stars in order to provide a rating of one through five (from left to right in this example embodiment). The CSPC 115 transmits data of the user's rating selection to the server 100 at 240. The transmission may also include the user ID (which may be previously stored in a cookie and retrieved for transmission) and the domain name (which may be transmitted as part of the entire web page address that is transmitted).

The server 100 receives the transmission of the user's rating selection and, in some embodiments, the user ID and/or domain name (e.g., URL). In some embodiments, the domain name need not be transmitted because the server already knows the domain name that the user is viewing from step 210. In some embodiments, the user ID need not be transmitted. For example, at initiation of the browser the CSPC 115 may log the user into the server 100 (by using information stored in cookie) and initiate a session and provide the IP address of the user's computing device. Thus, the identifier need not be a user ID each time but may be any identifier sufficient to allow the server 100 to know the user who is providing the rating.

In order to prevent multiple reviews of a website by a single person (which could skew the average) the server 100 may be configured to prevent users from providing multiple rating selections and reviews for a single website (or permit only a predetermined number). Based on the information received, the server 100 determines if that user (identified by the user ID or other data such as an arbitrary unique identifier) has already provided a rating of that website at 245. For example, the server 100 may compare the domains stored in memory in association with that user or that user's computer (by comparing the user IDs associated with the domain being rated). If the server 100 determines that the user has already rated that website (or that the user has reached the predetermined number of permitted ratings), the server 100 may discard the user's rating selection data. Alternately (in this embodiment), at step 250 the server 100 may replace the previous rating of that user for that domain with the newly received rating (in this embodiment the user's rating for each website is stored in memory in a database). In addition, the server 100 revises the average user rating for the domain being rated (and stores the new average in memory), which may include subtracting the user's previous rating (a number from 1-5) from the total sum of all the user ratings and adding the new rating (a number from 1-5). Thus, in this embodiment, the user may change his or her rating simply by clicking on the star 124 associated with the user's new selection of a rating.

If at step 245, the server 100 determines that the user has not yet rated that domain, at step 255 the server 100 stores the user's rating data (and associated domain) in memory in association with that user and also updates the average rating for that domain. Updating the average rating may include adding the user's rating (a number from 1-5) to the total sum of all the user ratings (stored in memory) and incrementing the total number of ratings for that domain. In some instances, the user may be the first person to rate the content item (e.g., domain). Thus, the server 100 may search for the domain in the database and if a null if returned, send a notification to the client that there are no ratings or reviews. The toolbar may then tell the user to be the first to review the domain. Upon receiving a rating of the domain, the website may store the rating supplied by the user as the average rating (in addition to storing the rating in association with the user.)

In an alternate embodiment, the CSPC 115 may be configured to perform step 245—to determine if the user has already rated a website (domain) and transmit an indication (of whether the user has rated the website) to the server 100 when the user provides a rating input. In another embodiment, the CSPC 115 may simply discard (e.g., ignore) the user's input of a rating if the user has already rated the website. Thus, a list of domains (or other content items) already rated by the user (with the rating) may be stored on the user's computing device (e.g., in a cookie).

As discussed, a user may provide a rating—a new rating or an update of a previous rating—by clicking on one of the stars. In other embodiments, the user input may be in another form such as by inputting into text box (or using a drop down menu to provide) a number between 0 and 100, a scholastic type rating (such A, B, C, D, or F—including pluses and minuses) or other desirable rating system.

In addition to simply providing a rating, users may elect to read reviews and/or to provide a rating and a review (e.g., a text input). Referring to FIG. 3, the user clicks on the number of reviews at step 260. In the example shown in FIG. 4a, the user would click on "29" (or a button that reads "Read reviews"), which causes the CSPC to transmit a request for reviews to the server 100 at 265. Referring to FIG. 4c, the user may click on the "3 Reviews" button 122 to read the reviews. The request may include the user ID (or other ID) and the domain name (e.g., transmitted as part of the URL) of the presently loaded web page.

At 270, the server 100 receives the transmitted request data and retrieves the most recently stored twenty-five reviews (and their associated ratings) and transmits them to the client (e.g., as an HTML web page). The CSPC 115 receives and displays the received reviews and associated ratings in a new browser tab. Alternately the received data may be displayed in a new browser, a layer, a side browser window, or a frame of the existing browser window. Each review may include a rating, a review title ("Great website for kayaks"), an author (who provided the review), a date the review was written, review text, and metadata about the review. For example, the metadata about the review may include a plurality of comments (where the other user comment on the review). In addition, the metadata may include a rating of the review. In this example embodiment, referring to FIG. 7, users reading reviews may click on one or more buttons such as a thumbs up button 131, thumbs down button 132, and a bogus button 133. A thumbs up vote indicates that the review was helpful and a thumbs down button indicates that the review was not helpful. A bogus vote indicates that the review is a fake (or otherwise dishonest) review (e.g., an owner of a website reviewing his or her own website). A tally of the total number of thumbs up, thumbs down, and bogus votes may be stored and transmitted by the server 100 for display via the host website. Thus, the integrity of the reviews may be increased by eliminating reviews that have a predetermined number (or percentage) of bogus votes and/or sorting the reviews (in search results) by descending number of net thumbs up votes (net thumbs up votes computed by the number of thumbs up votes minus the number of thumbs down votes).

The user may interact with the received web page to request additional reviews (and ratings) for review and/or to post a review. If the user requests to post a review, the user may be required to log in with a user name and password at step 275 (or to register with a user name and password if the user has not previously done so). Alternately, the user's user ID, stored in a cookie, may be retrieved by the CSPC 115 and transmitted to the server 100 to authenticate the user. Any suitable method of identifying (and in some instances authenticating) the user may be employed.

At step 280, the server determines if the user has already rated or reviewed and the website. If the user has rated or reviewed and rated the website, the server retrieves that user's rating or review and rating and transmits the retrieved information in the HTML form to the client for editing at step 285 as illustrated in FIG. 6. For example the text of a previously provided review may be displayed in a text box by the client to allow editing of the review by the user. The rating may be updated by clicking on a new star (on the HTML page) to update the rating when the form is submitted as discussed above.

If the user has not reviewed the website before, the server may simply transmit a html form to the user to supply review content. In either instance, the user may supply information to the form, select a rating and submit the form to the server 100. In some embodiments, the toolbar (the CSPC 226) may cause a text box to be displayed (e.g., in a cascade layer) to allow the user to supply a review (or edit a review).

At step 290, the server 100 receives the new review and rating data. At 295, the server 100 stores the user's new rating and review data in memory in association with the user (e.g., the user ID) and domain. In addition, at 297 the server 100 revises the average rating for the domain in memory and increments the number of reviews for the domain.

While the embodiment described above is described in the context of reviewing a third party website, the present invention is also applicable for providing ratings, reviews and/or other supplementary content for nearly any media content include web pages, sub-domains, videos, audio, images, products, services, persons (e.g., users of dating sites, users of social networks, persons in the news, celebrities, politicians, etc.) and others.

For example, the invention may be used to rate sub-domains (such as a particular social network hosted by Ning® or a vender having a virtual retail store hosted on a sub-domain) or a web page instead of, or in addition to, the domain. For example, an embodiment of the present invention may be used to rate and review the web pages of individuals of social networks (e.g., Facebook®, MySpace®, Hi5®, LinkedIn®, Twitter®, etc.), a news article, or a particular product (e.g., displayed and offered for sale on a web page thereby providing reviews of the product—instead of or in addition to—rating the website selling the product). The system may be used to provide ratings and reviews of a particular manufacturer or vender (e.g., an ebay® seller or buyer) even though that manufacturer or vender may sell products (or the product may be sold) via multiple websites.

In addition, the present invention may be used to rate and/or review multimedia content such as a video content (e.g., a video clip. sitcom, movie, sporting event, game show, etc.) or audio content (e.g., a song, comedy piece, speech, etc.) offered by any website.

Such reviews and ratings may be provided across multiple websites irrespective of the server(s) hosting the content or the website serving the link (for requesting the content).

Likewise, people may also be rated/reviewed. For example, users may rate a person in the news, a person who is a user of a social network website, a person who is a user (e.g., has a username and/or profile) on a dating site, a person who leaves comments on websites or blogs, etc.

In order to rate a particular domain, webpage, video content, news article, person, audio content, or sub-domain (collectively referred to herein as a "content item"), the server 100 in one example embodiment needs to receive information identifying the content item. In one example, the server receives the web address of each web page loaded and parses the web page to determine whether any content loaded into the browser includes a content item (e.g., web page, domain, video, etc.) that has been (or can be) rated. In other embodiments, the content of the web page may be parsed by the CSPC 115 (or server 100) to determine if any content on the web page has been (or can be) rated.

In one example, the server 100 may store in memory each review and rating in association with information identifying the content being rated/reviewed (for content other than a domain) such as a file name (or identifier) and stores the information in association with the domain.

For example, a web address loaded into a web page may comprise:

http://www.youtube.com/watch?v=79qixL2YVf4

The server 100 may store ratings and reviews in association with the filename or the identifier of "79qixL2YVf4" which follows "v=" (which identifies a video served by YouTube®) in association with the domain YouTube.com. Thus, in some embodiments the CSPC 115 may receive and display multiple ratings and numbers of review (review count) when a single web page is loaded. However, for many websites such as popular social networks and dating websites, only the people of such sites may be rated/reviewed.

For content on a web page that the user wishes to rate, the user may highlight or cut and paste (or type) information identifying the content to be rated (e.g., a file name, a person's username, a portion of an article, a person's name, a product name, a product model number, a manufacture name, etc.) into a text box in the frame, browser (e.g., toolbar), or web page. The identifying information of the content item to be rated, the webpage (or domain) associated with the content (e.g., on which the content is contained), the user's user ID, and the rating may then be transmitted to the server 100 for storage. The domain name associated with each rated content may be classified (e.g., by the user, system operator, or server based on metadata found in web pages of the website) into various categories (e.g., news, social network, dating, retail, video site, etc.). Thus, if a user is browsing a dating website (e.g., match.com®), the server 100 need only search the database for rated content items associated with that domain. If however, a user is browsing a retail website, the server 100 may search for rated content that may be associated with that domain and other domains (websites) having the same classification (e.g., retail websites).

As another example, when a person's Facebook® page is loaded it may include a video, a still image, and an audio file (even though the video and audio file are not played at loading of the webpage). The CSPC 115 may display a rating (and a review count) for each of the domain (Facebook.com), the webpage of the person's profile (e.g., facebook.com/john.html), the video content (john's video having a file name john.wmv), the audio content (file name john.mp3). For the video and audio content, the web page may include a link to a web address that includes the file names so, even though the video content or audio content may not (yet) be presented to the user, the CSPC 115 (and server 100) may collect the file names from the web page and provide the average rating and review count of each. In addition, the server 100 may store all the file extensions for each type of content item (e.g., video, audio, web page, domain) so that the server 100 can distinguish between the different media types of media being reviewed.

The ratings and reviews displayed in the above described embodiments has been displayed separate from the content of the webpage (e.g., in a frame or in a browser toolbar). However, other embodiments may display the average rating and review count over (or on) the web page and, in some embodiments, the rating and review count may displayed adjacent the content (e.g., domain, video, username, product, etc.) for which ratings or ratings and reviews apply such as, for example, in an overlay (e.g., a different cascading style sheet layer, flash) or by encoding the content of webpage. This may be especially helpful for when one web page contains multiple items having associated ratings and reviews.

For example, upon receiving search results from a search engine such as Google®, Yahoo®, MSN®, or other engine, the domain name of each search result on the search results page may be collected and transmitted to the server 100 by the CSPC 115, which, in response, transmits an average rating and review count (if any) for each domain name included in each search results.

Upon receipt, the CSPC 115 may display the average rating and review count for each item of search result (e.g., each domain of the search result) over the search result web page with each average rating and review count being in close proximity to (or in some other way visually indexed or associated to) the associated search result item (containing the domain for which the average rating and reviews apply. The display may be accomplished by presenting the review count and ratings in a different cascading style sheet layer or by encoding the HTML page of the search results with the review counts and ratings. The user may click on the review count to read the reviews or click on a star to provide a rating of any of the search results. Future searches may then factor in the rating of each search result item when sorting the search results (prior to being transmitted to the client requesting the search). Thus, if the search engine has access to the rating data (e.g., to server 100), the rating may be used to determine what search results to present and used (along with other factors) to sort the search results.

Alternately, the CSPC 115 may display a small icon near each search result indicating that a rating is available for a particular website (when available) and when the user moves the cursor over the search result item the rating and review count my be displayed in a pop-up flash bubble.

The prevent invention also may be used to receive ratings (and review counts) or to provide ratings and reviews of emails (or content in emails such as HTML based email such as Hotmail.com®), content in instant messages, blogs, microblogs (e.g., Twitter pages), etc.

As discussed, the present invention may be used to receive ratings (and review counts) and/or to provide ratings and reviews of people such persons who post profiles on a dating server (e.g., match.com®, plentyofFish.com®, dating.com®, etc.), social networks (e.g., Facebook®, MySpace®, HI5®, etc.), ebay sellers/buyers, people who leave comments on websites such as blogs. For example, when a person leaves a comments on a blog they typically must sign in using a username which is included at the end of their comment when other users read the comments (e.g., by highlighting the username with the cursor (or cutting and pasting the username into a text box) and clicking on one of the 5 five stars). Thus, when a page is loaded the CSPC 115 and/or server 100 may determine if any users (or in other words or phrase) on the web page have an associated rating. If so, the CSPC 115 and server 100 collaborate to provide the rating(s) of the users (and other content on the web page) to the end user viewing he webpage (e.g., as described above with respect to web pages). In some embodiments, each user may configure his or her CSPC 115 to display ratings and reviews of only selected content. For example, the user may wish only to see reviews and ratings of websites and people (but not images and videos). The configuration data may be transmitted to the server (or provided to the server 100 by the user via the host website) so that the server 100 does not transmit such data to the client.

Figure 5:
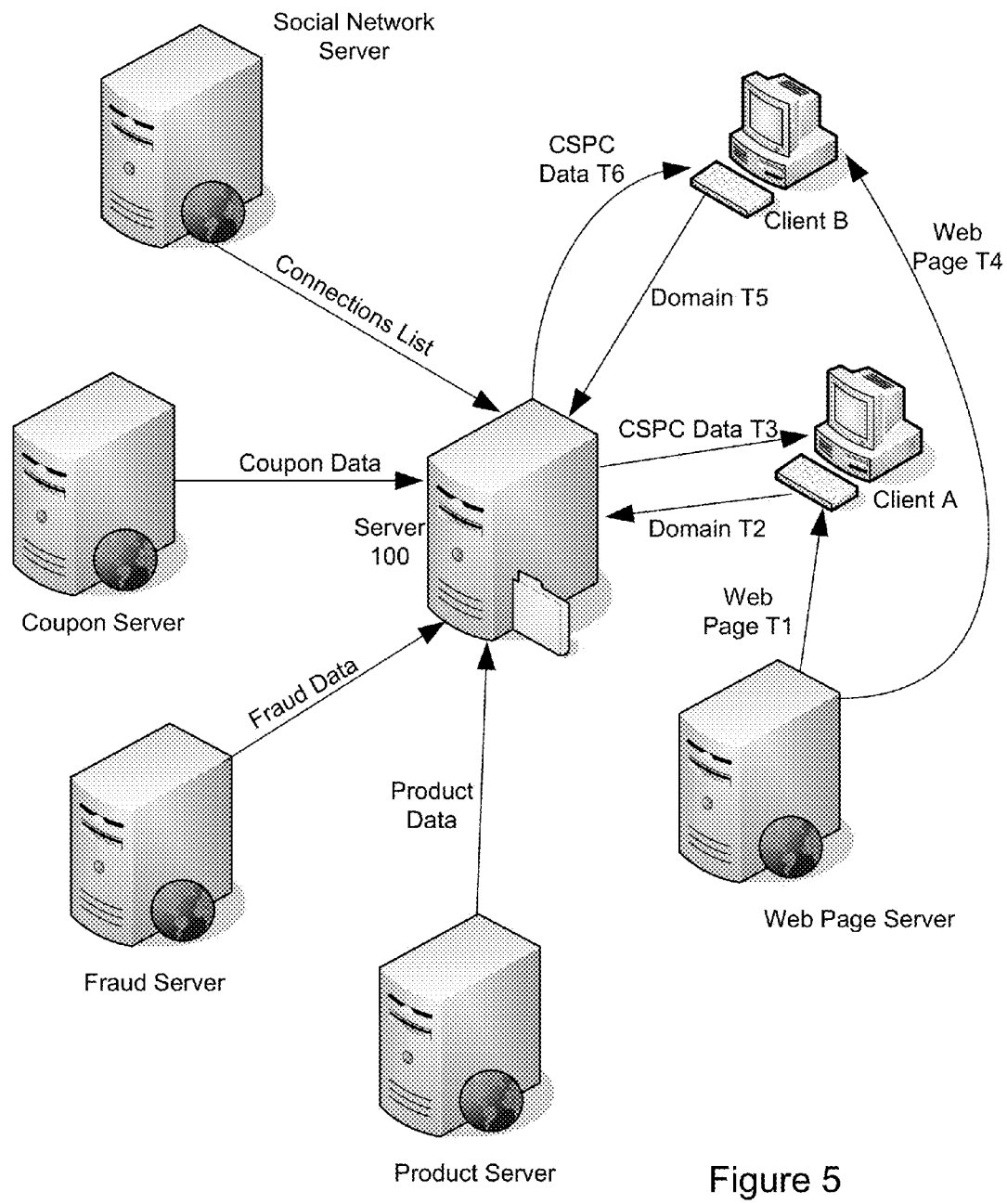
FIG. 5 depicts a server system according to an example embodiment of the present invention.

Referring to FIG. 5, the system may also be used to provide alerts to end users. For example, if a first user wishes to notify other users that a particular website has committed a fraud, they may "flag" the website with a fraud alert when supplying a review (e.g., by clicking on a particular button that stores a fraud alert in memory of the server 100).

When subsequent users visit that website, they will receive the average rating and review count display and additionally, a fraud alert (or fraud count or other alert) indicating the number of users reporting fraudulent behavior by the domain (or vender, manufacturer, person, user, etc.). The user may click on the fraud alert to read the fraud alert, which may comprise a description of the fraudulent activity as described by the user supplying the fraud alert.

In other embodiments, the server 100 may periodically retrieve information about the domain from another remote server such a web server managed by the Better Business Bureau® (bbb.org) that receives and catalogs complaints and other data about businesses. Periodically (e.g., weekly) or in real-time upon receiving a notification from a client, the server 100 may request information from such remote servers that relates to fraudulent activity, complaints, etc. and similarly provide (similar to provide an indication of fraud) an indication of such to the CSPC 115 for display to the user similarly to the fraud alert.

The server 100 may access one or more other servers that offer coupons, discounts and other financial compensation or incentives for particular websites. When the user visits a domain (or web page) for which coupon content is available, the server 100 transmits a coupon alert to the CSPC 115 for display to the user. The user may click on the coupon alert to review the coupon description and, if desired, access the third party website to request the coupon.

The server 100 may access one or more other servers that offer product information such as a list of websites offering a product (associated prices of each), and in some instances reviews (e.g., simon.com, shopping.com. bizrate.com, etc.). When the user visits a domain for which product content is available, the server 100 transmits an alert to the CSPC 115, which displays a product alert to the end user. The user may click on the product alert to review the product content (e.g., a list of other web retailers of the product offered by the webpage that the user is presently viewing) to compare the price and terms (e.g., shipping, tax, etc.) for the product offered by other websites. Alternately or additionally, in response to a user searching for a particular product on a search engine (e.g., Google®) or retailer (e.g., Amazon®, the CSPC 115 (e.g., embodied as a browser toolbar) may transmit the search term(s) to the server 100 (or other remote computer system) and, in response, receive and display the lowest price offered for the product searched (or a similar product. The data of lowest price and the identity of the product for which the price applies may be supplied by one or more third party websites (such as shopping.com) or from the server (which itself may receive the data from one or more third party websites).

The server 100 may also provide various other services to users. Upon accessing a web page supplied by the server 100, the user may search for his or her highest rated websites or other content items(e.g., to find all the websites that he or she has rated as 5 stars, or greater than or equal to 4 stars, etc.). Additionally, the user may search for the highest rated websites (or other content) by all users or the highest rated websites (or other content such person, product, manufacturer, etc.) by all users in a particular category (e.g., video sites, retail sites, banking sites, sports sites, or in the case of rated persons, men, women, blogger, blogger commenter etc.). Thus, when providing a review the first ten users may be asked to categorize the content (and sub-content in some instances) to be rated which, and in some embodiments, may be at least one or more of the following:

1. website (domain) and the type of website (social website, dating site, sports site, blog (and type of blog), retail (and type of retail) etc.)
2. person (e.g., a person in the media, providing comments on a website/blog, celebrity, politician, described in the news, etc.)
3. personal page (e.g., a person's profile page on a social networking site or dating site)
4. video file (and type such as comedic, action, political, etc.)
5. video source
6. video channel
7. image
8. audio file (and type such as music (and type of music), comedic, etc.)
9. digital radio station
10. product (and type of product)
11. vender
12. manufacturer
13. service or service provider The server 100 may then categorize the rated content in accordance with the most common category assessed by the first ten users. Alternately, the user may asked to supply one or more tag words (one or more words that describes the content such as umbrella, funny video, real estate agent, doctor, etc.) as illustrated in FIG. 6. Thus, the server 10 may allow users to search the internet for the top rated audio comedic audio files, top rated retail websites of a particular category, or the top rated content of another type (e.g., video) and sub-type (e.g., comedic video) by searching the categories and/or tag words. The server 100 may then allow users to browse a directory of rated content wherein the directory is based on the user categorizations and presented in accordance with user ratings (sorted and then displayed in descending rating order).

In addition, after a domain, webpage, or other content item is rated, the server 100 may transmit a request to obtain metadata of the website such as, for example, meta Content keywords and/or description, which may be stored in memory in association with the rated content, ratings and reviews. Thus, when a user searches for highly rated content, the server 100 may search the keyword data and/or description of the searched content and limit the search results to content having the search words (and similar words) in the keyword data and/or description data (or other metadata). Thus, the server 100 may employ a software program that executes periodically (e.g., nightly) that transmits a request for each web page (e.g., of each domain) that gets rated. The metadata collected forms part of the web page (e.g., the home or root web page for the website) of the rated domains. More specifically, the metadata collected from each web page may include the title (identified as the text between the <title> and </title> tags), the meta name description (identified as the text after the tag <meta name="description" "content=". . . ">), meta name keywords (identified as the text after the tag <meta name="keywords" content=". . . "> in the webpage (e.g., index.html, default.htm, etc.), and any other suitable content descriptive of the web page. The server 100 (by parsing the meta name tags) may store the collected data in separate fields in a database in association with the domain (or other content item) rated.

As discussed, the server 100 receives a notification each time a user visits a new web page. Upon registering with the server 100, users may configure their data. For example, a user may permit the server 100 to store in its memory each site visited indefinitely. Consequently, a user may log into the server 100 to look at all the websites that the user has visited in the past day, week, month, etc. and may read reviews/ratings, and post reviews/ratings for each. This feature may be especially helpful if a user has previously found some desirable content but is unable to recall what website had the content. The user may also configure the server 100 to not store the user's surfing history. A parent or employer may also view the domains and web pages that the child or employee has viewed. In addition, via the host website, a user may search for other users having visited a particular website (e.g., zizbang.com), for other users who visit some of the same websites (e.g., user who visit five or more of the same website), for users who visit the same types of websites (e.g., financial websites), and/or for users who visit similar websites (e.g., kayaking websites). Provided the other users' privacy settings are set appropriate, the server 100 may query the database according to the search request and transmit a list of users most closely satisfying the search request.

The user may also bookmark sites for storage of the bookmarks on the server 100. Thus, a user may click on a bookmark button (e.g., a favorites button 123) to store the web address of the presently loaded web page on the server 100 in association with the user's user id.

Social networks are becoming more and more widely used and end users are developing strong social networks and participating in various social groups. The present invention may be used by a member to more effectively share information with the member's friends and are members of the user's social networks. In addition, information from a user's social networks may be used to provide a better rating of a website or other content. For example, a user may import (upload) information of his or her social group (e.g., a list of friends, connections or the identity of a group), which may be stored on the server 100. A user may also supply his or her social groups, professional associations, email address(es) and usernames at one or more other websites such as social networking sites, dating sites, professional sites, blogs, etc. Thus, when other user's import or otherwise provide their lists of connections/contacts, the server 100 may have sufficient information to "connect" the two users and provide additional services such as alerting both users when they are visiting the same website. In addition, instead of searching for content that has been top rated by the public at large, the user can search for content that has been given a high rating by other users of the same group (professional engineers, IEEE, Republican, Democrat, etc.) and/or that are in that user's list of friends or connections. Such groups may be those people in the groups identified by the member. Alternately, the server 100 website (itself being a social network) may allow members to establish groups and searching may be limited to the average ratings of content items (e.g., website domains) that is computed by averaging only the ratings of the members of the one or more groups.

In addition, the server 100 may store a list of websites (and/or web pages) visited by each user. Thus, a first user may request and receive from the server 100 of list of the websites (or web pages) visited (e.g., in the last week) by—or all the favorites of—one or more other particular users in the first user's friend list, all user's in the first user's friend list, the top rated websites (or other content) of one or more users in the first user's friend list, and/or other list of content. Thus, a user can see his friends "favorites" and a list of their recent activity. In addition, users may also bookmark any webpage via a bookmark button displayed by some embodiments of the CSPC, which causes the CSPC to cause a pop-up to be displayed to receive additional information about the bookmark—all of which is transmitted to the server 100 and stored in association with that user. Other users who are connected to that user (e.g., in a friends list) via the social network hosted by the server 100 (or other interconnected server) may view that user's bookmarks (and any associated comments, ratings, and reviews) and visit the bookmarked web pages. In addition, a user may set his or her configuration data to receive a notification when any or specific friends (or members of a group) rate a site, review a site, bookmark a site, or add a site as a favorite. The notification may be received via email and/or posted on the user's home page of the host website to be viewed when the user views the page to review messages and activity of his or her friends.

In addition, when a user logs into the server 100, the user may receive a visual indication indicating that other users in that user's list of friends or connections or in the same social group have rated new sites and/or rated one or more new sites with a high rating. The user can then request to see the newly rated sites and click a link to view them.

A user (a first user) may change his associated configuration with the server 100 to configure the server 100 to transmit a notification for display by the CSPC when any other identified users (e.g., users identified in the first user's friend list (either on the server 100 and/or one or more social networking sites (e.g., Twitter)) are active on the same website that the first user is active (e.g., to thereby allow the first user to attempt to communicate with one or more or of them (e.g., via instant messaging, phone, email, etc.) and/or that have recently (e.g., within the last hour, day, or week) have visited that website (or web page). Thus, the server may perform the processes of identifying one or more friends of the user associated with the ID received from the CSPC; determining whether the one or more friends of the have received a web page from the domain within a predetermined time period; and transmitting a friend notification to the end user computing device if one of the one or more friends of the user have received a web page from the domain within the predetermined time period and wherein the friend notification identifies at least one friend. The CSPC executing on the end user computing device may then receive the friend notification, and display a visual representation of the at least one friend identified in the friend notification concurrently with the web page (e.g., in the toolbar). In addition, any user may also elect to be invisible so that other users are not notified when they are visiting any common website or select websites.

As discussed, websites operators can put a graphic on their page with a link to their reviews and ratings and that dynamically provides their average rating and number of reviews to their visitors and any fraud alerts. Such operators may be automatically notified if a user provides a poor rating (e.g., a one or two stars) or flags the website with a fraud alert. The operator may then be given one week to resolve the dispute with the user (to get the user to change the rating and review and/or remove the fraud alert) before the server 100 displays the fraud alert or includes the rating into the average rating computation. Similarly, users may include the graphic on third party websites when they post a comment, on their dating site profile web page, and/or their own social networking profile pages.

Different types of content may have a different rating scale and/or be rated differently. For example, users may be rated based on the usefulness of their comments on blogs, their integrity, their fun factor (e.g., on a dating site), or other parameter. Different visual indicators may be used to indicate a different rated parameter.

In response to a user request, for any given rated content the server will transmit for display statistical information about a website such as the number of 1, 2, 3, 4 and 5 star reviews, the number of fraud alerts, the date of the most recent fraud alerts, etc.

Users may also become a social member of the host website hosted by the server 100 and establish a personal page, connect to (befriend) other members and post content about themselves.

In one embodiment the server 100 stores:
Rated Content
    Statistical (average rating), ratings, review count, tags and/or classifications, etc.
For each operator of each domain (and other media content owners)
    Configuration Data (if applicable)
        Alerts, membership (e.g., send fraud alert, low rating alert, etc.) classification
        tags, user classifications, keywords,
For each user:
    user info (username, password);
    ratings and reviews and domains (and sub-content's if applicable such as identifiers);
    Configuration data—Friends, privacy settings, email settings, etc.

More specifically, in one embodiment where the system allows ratings of domains and persons on social networks and dating sites, the server 100 may store (or have access to) a database that includes a plurality of tables such as those identified below. It is worth noting that the table and database may include additional (or different) information.

A user table that stores for each user:
A. user ID (e.g., also stored in cookie)
B. username (selected by user)
C. password
D. email address
E. referring user ID (user ID of member who referred user (if any))
F. user info (first name, last name, city, country, zip code, gender, Birth date).
G. List of friends—emails (and user ID when joined) that the user has given privileges to view their ratings and reviews.
A Reviews Table that stores for each rating/review:
H. user ID of the user providing the rating I. Content ID (to identify the content item of Content Table being rated/reviewed)
J. rating (e.g., a number 1-5)
K. review, if any (e.g., text description)
L. A review title (e.g., text)
M. A domain of rated content
N. A URL provided by CSPC 115
A Content Table content item rated (e.g., domain or person)
O. Content ID (an identifier assigned by the server)
P. domain name (e.g., CapitalLegalGroup.com)
Q. content name (e.g., this could be either the domain name or a ID number (an ID of a of someone on facebook.com, match.com, etc., a video or an image, or a product)
R. rating count—total number of ratings, which gets incremented for each rating of that content
S. total rating score (the sum of all users ratings for the content)
T. average rating (total rating score divided by total number of ratings)
U. review count—total number of reviews (gets incremented for each new review of that content;
V. Content Classification (person or website.).
W. Content Title (text provided user)—(would be user name or name if it is a person being rated/reviewed or blank if it is a domain being rated/review.
X. Fraud count (incremented each time someone submits a review that includes a fraud alert).
A fourth table storing domains on which users can rate people storing:
U. Domain (e.g., Facebook.com)
W. PreText=the text in the URL immediately preceding the user ID of the profile displayed on the domain (such as "user_id=")
X. PostText=text in the URL immediately following the user's ID (may be blank in some instances).
V. Number of characters (digits) that constitute the user ID on this domain (if necessary)

Thus, the fourth table includes the information necessary to allow the server 100 to parse the URLs received from multiple websites (e.g., multiple social networks and data services) to identify the user ID associated with the person's profile being rated on each domain.

In addition to the above, the user may annotate web pages with content such as information the user wishes to see when the user returns to the web page and/or with information that the user wishes others in his or her social group or friends list to see when they visit the web page or domain. Such annotation may include textual comments, graphics, annotation, video, and/or audio. Thus, a user could leave an audio, video, or text comment about a blogger, website, a video, an image, or a person on a dating or social website, etc. The annotation comment is stored in memory of the server 100 as discussed above and transmitted for display by the CSPC 115 when a member of the users group views the content.

As shown in FIG. 5, at time 6 (T6), Client B may receive data from the server 100 sent to the CSPC 115 that includes one or more of annotations (e.g., from the end user using client A), and a notification that other users (e.g., friends of the end user of client B) such as the end user of Client A is also active on the same domain serving the web page (e.g., the server 100 determines that the user of Client A is a friend (as determined by the host website of server 100) and has received a web page from the same website/domain within the last five, ten, fifteen, thirty, or sixty minutes), a fraud alert, a coupon alert, a product alert, an average rating and review count of the domain (and other media content associated with the received web page), and other data. The identity of the user's friend may be displayed on the toolbar as their usernames, their real names, or either along with their photo (icon) as supplied to the host website on the toolbar. The user may then click on any of the identifying information to request an instant message communication (to enter into a chat).

The system may employ a multi-tiered affiliate program wherein third parties referring new members receive a percentage of the revenue generated by that the user and up to four additional vertically referred new users (total of 5 tiers). For example, each affiliate may obtain a Google ID, which is rotated (by the server 100) into web pages served by the server 100 in accordance with the percent of revenue (or based on the percentage or referred members) accorded to the affiliate.

As discussed above, the server 100 may also act as a web server to host a website that allows member using the toolbar (or other plug-in) to interact with other members (e.g., post messages, send emails, instant messaging), read, edit and delete their reviews, read the reviews of other members, search for reviews (of their own, all other members, or search for reviews within a group of members (e.g., entrepreneurs).

In addition, many users may use multiple social networks and dating sites. The host website may include an interface for requesting the URL to the profile page of its members at such other sites. For example, a user may provide a link to his or her profile on Facebook, MySpace, Digg, Twitter, Match.com, Date.com, and Flickr.com. If configured by the user, the server 100 may display these links to other user who visit the user's profile page on the host website, which therefore provides one central location from which to visit all of that user's profile pages. In addition, if any of those profile pages get rated (or reviewed) by anyone, the user of the host website may be provided a notification of the rating or review. In this embodiment, all reviews also include a rating but a rating need not also include a review. Of course, the user's profile on the host website may also be reviewed and rated and a notification provided.

Most brick and mortar establishments have a website or are otherwise described on the internet (e.g., listed in a directory), which means they can be rated and review by the above described process. In addition, the server 100 may be accessible via mobile telephones that comprise the end user computing device discussed above. In one embodiment, an application (a CSPC 115) executing on a mobile telephone that includes location awareness technology (e.g., a GPS receiver and associated mapping software (to determine address information) and directory information (to determine a location name or business name of a given address) intermittently transmits the location of the telephone to the server 100. In response, the server 100 transmits the rating and reviews (and locations) of all of the content items stored in memory that are within a predetermined distance (e.g., one mile) of the mobile telephone. Depending on the quantity of information to be provided, the content of the review may not be transmitted (and instead only the title and rating is transmitted) although the user can request and receive the review content. Upon receipt, a map may be displayed to the user with all the locations of the items having been rated identified on the map. If subsequent transmissions of the location data by the mobile telephone indicate that the user has moved from his or her previous location, the server 100 may transmit updated review data for the new location.

In addition, the mobile telephone may be configured to a obtain location information of the mobile telephone at a first location. This process may be repeated each thirty seconds. The phone may then determine a first address associated with the first location information and determine a first business name associated with the first address. The mobile telephone may then transmit a request to the server 100 for rating data of the first business. The request may include the business name and an identifier associated with the user. In response, the server may transmit, and the mobile phone receive, the rating data for the business. The request may be transmitted anytime the user changes locations and/or anytime the user maintains a location for at least a predetermined time period (e.g., sixty seconds). Thus, the rating (and review count) may be received as the user travels without any input by the user.

In addition, when the user travels to any new location the mobile telephone and inputs a rating (or rating and review) the mobile telephone may perform the process of obtaining location information of the mobile telephone, determining an address associated with the location information; determining a business name associated with the address; and transmitting the user rating (or user rating and review), the address, the identifier, and the business name to the remote server for processing (for storage in association with the user and for being factored into the average rating for the business name). Thus, the user may not need to supply the address, business name, etc. when providing a review and/or rating.

The user may also set configuration data on his or her mobile computing device. For example, the user may set a configuration so that the mobile telephone emits an audible alert or vibratory alert if a particular content item (e.g., a restaurant, coffee shop, antique store, baby store, park, etc.) that is rated above a rated threshold value (e.g., 4.5 stars or zero stars) is within a threshold distance (e.g., 0.5 miles) from the mobile computing device. The emission of the alerts may be controlled by the server 100 which monitors the location of the phone (as received from the mobile telephone or other system), compares the location with the rated content items within a predetermined distance (e.g., is the content item within the threshold distance), compares the ratings and other characteristics of the rated content item (e.g., the type of item rated and the rating) with the configuration data supplied by the user (e.g., compare with type of content item, rated threshold value) to determine whether to emit the alert (and may then transmit control data to the mobile phone which emits the alert in response to receiving the control data). Alternately, the emission of the alerts may be controlled by the mobile telephone which monitors its location, compares its location with the location rated content items receives (e.g., is the rated content item within the threshold distance), compares the ratings and other characteristics of the content items (e.g., the type of item rated) with the configuration data supplied by the user (e.g., type of content item, rated threshold value) to determine when to emit the alert. In some embodiments, the server 100 and the end user computing device may cooperate to cause the alerts to be emitted. In addition, the order of these steps may be vary and comprise any suitable order.

In addition, users with mobile devices having the GPS also may rate and (if desired) review any location. For example, instead of finding the website associated with the business (or park, etc.) that they are in, the user may simply open the rating application (CSPC 115) resident on the phone and input a rating (e.g., 4 stars), which is transmitted along with the mobile telephone's location to the server 100. If necessary (depending on the form of the location data sent to the server), the server 100 may then determine the address corresponding to the received address data. Additionally, if necessary, the server 100 may determine the business (or otherwise identity the location such as being a park, an airport, etc.) corresponding to the address (or location data). Alternately, the mobile telephone may determine the address and business at the location where the user enters the rating data, which is then transmitted to the server 100 for storage along with the rating data and user ID (e.g., which may comprise the user's telephone number).

The rating data and information identifying the location (e.g., the name of the location such as the business name, or other name of location (such as central park, JFK airport)) are stored in memory. In addition, the server 100 and/or the mobile telephone also may store data (along with the rating data) of the category of the location such as the type of restaurant (e.g., Chinese, American, fast food, etc.), antique dealer, park, book store, etc. The data of the type of location may be (1) supplied by the user rating the location; and/or (2) collected by the server 100 (or mobile telephone) from a local or third party directory after the address or name of the location (e.g., business) is determined. Additionally, after the first or some other number of users first rate the location, many of these steps may be omitted since the server 100 will already know the category and name of the location although the steps may periodically or continuously be performed to account for the possibility that the information may change (e.g., a new business may open at the location).

The server may be configured to inform the user when any of his or her friends are within a predetermined distance to the user (e.g., such at the same address or business) or when the friend has visited the user's present location within a predetermined time period (e.g., the last thirty minutes). The server may receive the location information of the phone (e.g., address, business name, or coordinates) and the ID associated with the user from the mobile telephone; identify one or more friends of the user associated with the ID; determine whether the one or more friends are present at the same location (or were present within a predetermined time period); and, if so, transmit a friend notification to the mobile telephone. The friend notification identifies the one or more friends and the mobile telephone receives the friend notification and displays a visual representation of friends identified in the friend notification.

The servers described herein may include one or more computer systems that each include a processor, memory, user input and user output mechanisms, a network interface, and executable program code (software) stored in memory that executes to control the operation of the server. Various commercially available computer systems and operating systems software may be used to implement the hardware and software. The components of each server may be co-located or distributed. In addition, all or portions of the same software and/or hardware may be used to implement two or more of the functional servers shown. Thus, in some embodiments the components of the figures may be considered functional components that employ the same hardware and some of the same program code. Other embodiments may include different functional components. In addition, the present invention is not limited to a particular environment or server configuration.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for providing ratings, comprising:
a non-transitory computer usable storage medium having a computer readable first program code embodied therein, said computer readable first program code adapted to execute as a browser toolbar in a browser on an end user computing device operable by a first user executable to implement a method comprising:
transmitting a request to a remote computer system in response to a web page being loaded into the browser executing on the end user computing device;
wherein the request includes an identifier (ID) and a Uniform Resource Locator (URL) of the web page loaded in the browser executing on the end user computing device;
in response to said transmitting, receiving a rating value from the remote computer system;
displaying the rating value in the toolbar concurrently with the web page;
receiving a first rating of the first user from the remote computer system;
wherein the first rating comprises a rating previously supplied by the first user prior to the web page being loaded into the browser;
displaying the first rating in the toolbar concurrently with the web page;
receiving a user input comprising a second rating from the first user;
transmitting the second rating to the remote computer system; and
displaying the second rating in the toolbar.

2. The system according to claim 1, wherein the remote computer system is configured to:
receive the second rating;
store the second rating;
calculate a new rating value incorporating the second rating; and
store the new rating value in memory.

3. The system according to claim 1, wherein the URL includes a domain and the remote computer system is configured to:
access coupon content from one or more other remote computer systems;
determine if coupon content is available for the domain;
transmit an alert to the end user computing device if any coupon content is available for the domain; and
wherein the first program code is executable to receive the alert and display the alert in the toolbar.

4. The system according to claim 1, wherein the URL includes a domain and wherein the remote computer system is configured to
receive the ID;
identify one or more friends of the first user associated with the ID;
determine whether a computer associated with any of the one or more friends has received a web page from the domain within a predetermined time period; and
transmit a friend notification to the end user computing device if a computer associated with any of the one or more friends has received a web page from the domain within the predetermined time period.

5. The system according to claim 4, wherein the friend notification identifies at least one friend and wherein the method further comprises:
receiving the friend notification; and
displaying a visual representation of the at least one friend identified in the friend notification concurrently with the web page.

6. The system according to claim 1, the remote computer system is configured to:
receive the URL;
determine a domain from the URL;
determine the rating value based on the domain; and
transmit the rating value to the end user computing device that transmitted the request.

7. The system according to claim 6, wherein the remote computer system is further configured to:
retrieve from memory the first rating for the parsed domain and the received ID; and
transmit the first rating to the end user computing device.

8. The system according to claim 1, wherein the remote computer system is configured to:
store a plurality of user ratings for each of a plurality of domains in a database;
receive the URL;
determine a domain from the URL;
determine the rating value for the domain based upon the plurality of user ratings for the domain; and
transmit the rating value to the end user computing device.

9. The system according to claim 8, wherein the remote computer system is configured to:
receive from a client a search request that includes one or more keywords;
search one or more fields of the database for domains associated with the one or more keywords to provide search results;
sorting the search results, at least in part, in descending order of the rating value associated with each domain of the search results; and
transmitting at least a portion of the sorted search results to the client.

10. The system according to claim 9, wherein the remote computer system is further configured to:
store a plurality of user reviews for each of a multitude of domains in the database; and
wherein each of the plurality of user reviews for each domain are associated in memory with a different ID.

11. The system according to claim 1, wherein the remote computer system is configured to:
receive the URL;
parse a domain from the URL;
determine whether the domain comprises a domain on which content may be rated; and
if the domain comprises a domain on which content may be rated:
parse a content identifier from the URL;
search a database for a content rating value associated with the domain and the content identifier; and
transmit the content rating value as the rating value to the end user computing device that transmitted the request.

12. A method of distributing meta data related to websites to an end user, comprising:
transmitting to a remote computer system a first URL of a first webpage with a toolbar executing on an end user computing device, in response to loading of the first webpage into a browser executing on the end user computing device;
with the remote computer system:

receiving the first URL;
determining a first domain of the first URL;
retrieving from memory a first rating value associated with the first domain; and
transmitting the first rating value to the end user computing device; with the end user computing device:
receiving the first rating value;
displaying the first rating value in the toolbar concurrently with the first web page;
receiving a user input comprising a first user rating indicative of a rating of the first domain; and
transmitting the first user rating to the remote computer system;
with the remote computer system:
receiving the first user rating;
storing the first user rating in memory in association with the first domain;
wherein the first rating value comprises an average user rating of the first domain supplied by a plurality of users;
calculating a second rating value for the first domain that incorporates the received first user rating;
storing the second rating value in the memory in association with the first domain; and
transmitting the second rating value to the end user computing device; and
with the end user computing device:
receiving the second rating value; and
displaying the second rating value in the toolbar concurrently with the first web page.

13. The method according to claim 12,
with the remote computer system:
retrieving from memory a user rating associated with the first domain supplied by the end user prior to the first webpage being loaded into the browser;
transmitting the retrieved user rating to the end user computing device;
with the end user computing device:
receiving the retrieved user rating; and
displaying the retrieved user rating concurrently with the first webpage.

14. The method according to claim 12, further comprising with the remote computer system:
receiving a second URL comprising a second request transmitted from an end user computing device;
wherein the second URL includes a second domain;
determining a content identifier from the second URL;
searching a database for a content rating value associated with the second domain and the content identifier; and
transmitting the content rating value as the rating value to the end user computing device that transmitted the second request.

15. The method according to claim 12, further comprising:
with the end user computing device, transmitting an identifier (ID) associated with the end user to the remote computer system;
with the remote computer system:
receiving the identifier;
identifying one or more friends of the end user based on the identifier;
determining whether a computing device associated with any of the one or more friends have received a web page from the first domain within a predetermined time period; and
transmitting a friend notification to the end user computing device if a computing device of any of the one or more friends have received a web page from the first domain within the predetermined time period; and
wherein the friend notification identifies at least one friend.

* * * * *